(12) United States Patent
Paxton et al.

(10) Patent No.: US 11,195,286 B2
(45) Date of Patent: Dec. 7, 2021

(54) IMAGE-BASED TARGET TRACKING

(71) Applicant: THE BOEING COMPANY, Chicago, IL (US)

(72) Inventors: Kevin R. Paxton, Placentia, CA (US); Maurice Masequesmay, Huntington Beach, CA (US); Peter Bystrom, Cypress, CA (US)

(73) Assignee: THE BOEING COMPANY, Chicago, IL (US)

( * ) Notice: Subject to any disclaimer, the term of this patent is extended or adjusted under 35 U.S.C. 154(b) by 156 days.

(21) Appl. No.: 16/538,630

(22) Filed: Aug. 12, 2019

(65) Prior Publication Data
US 2021/0049773 A1    Feb. 18, 2021

(51) Int. Cl.
*G06T 7/246*    (2017.01)

(52) U.S. Cl.
CPC .... *G06T 7/248* (2017.01); *G06T 2207/10016* (2013.01); *G06T 2207/10032* (2013.01); *G06T 2207/20224* (2013.01)

(58) Field of Classification Search
CPC ............... G06T 7/248; G06T 7/254; G06T 2207/10016; G06T 2207/10032; G06T 2207/20224; G06T 2207/30252
See application file for complete search history.

(56) References Cited

U.S. PATENT DOCUMENTS

| | | | |
|---|---|---|---|
| 5,475,428 A | 12/1995 | Hintz et al. | |
| 6,714,240 B1 | 3/2004 | Caswell | |
| 7,420,678 B2 | 9/2008 | Lundgren et al. | |
| 8,154,611 B2 | 4/2012 | Lundgren | |
| 8,295,578 B2 | 10/2012 | Lundgren et al. | |
| 8,964,047 B2 | 2/2015 | Robinson et al. | |
| 9,646,388 B2 | 5/2017 | Paxton et al. | |
| 16,373,174 | 4/2019 | Lundgren | |
| 2006/0007547 A1 | 1/2006 | Kamikawa | |
| 2009/0321636 A1* | 12/2009 | Ragucci | G01S 19/14 250/330 |
| 2011/0178658 A1* | 7/2011 | Kotaba | G01C 11/06 701/3 |
| 2011/0242328 A1 | 10/2011 | Twede et al. | |
| 2012/0325912 A1 | 12/2012 | Wang et al. | |

(Continued)

OTHER PUBLICATIONS

Liu et al. "Combining background subtraction and three-frame difference to detect moving object from underwater video." OCEANS 2016-Shanghai. IEEE, 2016. (Year: 2016).*

(Continued)

*Primary Examiner* — Katrina R Fujita
(74) *Attorney, Agent, or Firm* — Moore Intellectual Property Law, PLLC

(57) ABSTRACT

A device for image processing includes a memory configured to store multiple image frames of a sequence of image frames. The device includes a reference frame accumulator configured to combine a first group of image frames of the sequence of image frames to generate a reference frame. The device also includes a target frame accumulator configured to combine a second group of image frames of the sequence of image frames to generate a target frame. The device includes a difference frame generator configured to generate a difference frame based on subtracting the reference frame from the target frame.

20 Claims, 8 Drawing Sheets

(56) References Cited

U.S. PATENT DOCUMENTS

| | | | |
|---|---|---|---|
| 2013/0094694 A1* | 4/2013 | Newman | G06T 7/254 |
| | | | 382/103 |
| 2014/0016879 A1* | 1/2014 | Hogasten | H04N 5/3658 |
| | | | 382/264 |
| 2015/0163345 A1* | 6/2015 | Cornaby | G06F 3/0236 |
| | | | 345/633 |
| 2015/0254813 A1* | 9/2015 | Foi | G06T 5/002 |
| | | | 382/275 |
| 2016/0005154 A1* | 1/2016 | Meyers | G06T 5/008 |
| | | | 382/274 |
| 2017/0074640 A1 | 3/2017 | Cable et al. | |
| 2017/0358103 A1* | 12/2017 | Shao | B64C 39/024 |
| 2018/0003815 A1* | 1/2018 | Ranney | G01S 13/887 |
| 2018/0130191 A1* | 5/2018 | Fluckiger | G06T 5/001 |
| 2018/0176488 A1 | 6/2018 | Dvir | |
| 2018/0184015 A1 | 6/2018 | Richarte et al. | |

OTHER PUBLICATIONS

Wikipedia, "Bayer Filter," https://en.wikipedia.org/wiki/Bayer_filter, retrieved Apr. 1, 2019, 4 pgs.

Extended European Search Report for Application No. 19217870.5 dated Jun. 17, 2020, 8 pgs.

* cited by examiner

IMAGE-BASED TARGET TRACKING

FIELD OF THE DISCLOSURE

The present disclosure is generally related to image-based target tracking.

BACKGROUND

Techniques to identify and track targets using non-resolved image data include linear filtering, match filtering, and "track-before-detection" techniques. To illustrate, linear filtering is used to smooth images to reduce noise or "clutter" in the images. Match filtering is used to compare potential targets detected in a series of images to reduce false detections. Track-before-detection techniques are used to track potential targets and may enable detection of targets with relatively weak signals against a cluttered background (e.g., targets having a low contrast-to-noise ratio ("CNR") in the images).

Although use of such techniques can improve target tracking and identification, in some circumstances applying one or more of the techniques can be counterproductive. As an example, although linear filtering reduces clutter in an image, it also reduces peak target intensity in the image, which can impair tracking and detection of the target in the filtered image.

SUMMARY

In a particular implementation, a device for image processing includes a memory configured to store multiple image frames of a sequence of image frames. The device includes a reference frame accumulator configured to combine a first group of image frames of the sequence of image frames to generate a reference frame. The device includes a target frame accumulator configured to combine a second group of image frames of the sequence of image frames to generate a target frame. The device also includes a difference frame generator configured to generate a difference frame based on subtracting the reference frame from the target frame.

In another particular implementation, the device includes a memory configured to store multiple frames of a sequence of image frames from an image sensor while the image sensor is in motion relative to a scene. The device also includes a frame rate engine configured to determine a frame rate of the image sensor, based on a rate of relative motion of the image sensor relative to the scene, so that selected image frames in the sequence of image frames are offset relative to the scene by an offset amount that substantially matches an integer number of pixels.

In another particular implementation, a method for image processing includes combining a first group of image frames of a sequence of image frames to generate a reference frame, combining a second group of image frames of the sequence of image frames to generate a target frame, and generating a difference frame based on subtracting the reference frame from the target frame.

The features, functions, and advantages described herein can be achieved independently in various implementations or may be combined in yet other implementations, further details of which can be found with reference to the following description and drawings.

DETAILED DESCRIPTION

Figure 1:
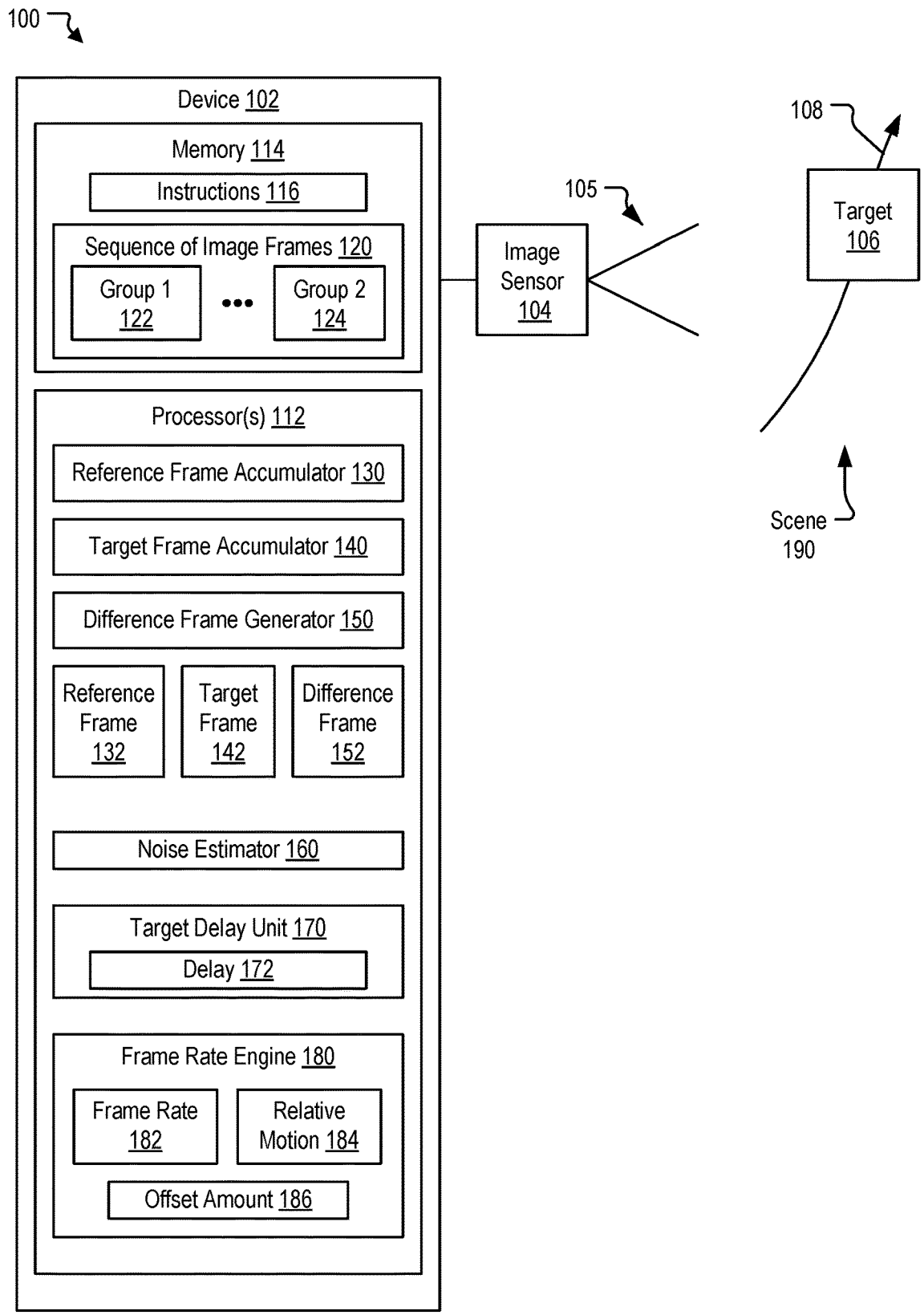
FIG. 1 is a diagram that illustrates a system configured to perform image-based target tracking and that includes a device for image processing.

Aspects disclosed herein include systems and methods for image-based target tracking. Although conventional techniques that include linear filtering, match filtering, and track-before-detection can assist in target tracking and identification, in some circumstances applying one or more of the techniques can be counterproductive, such as when the use of linear filtering to reduce clutter in an image also results in reduced peak target intensity, which can impair target tracking and detection.

Techniques presented herein include use of motion-compensated integration to reduce or remove background clutter to enable tracking of "dim" (e.g., low-contrast) targets. Multiple-frame image stacking is used to estimate a background frame and to estimate a target reference frame. In some implementations, the background frame is estimated using a continuous recursive filter. A low-clutter, high-CNR target image is generated based on a difference between the target reference frame and the background frame. In some implementations, timing of image capture of an image sensor is controlled to reduce high-spatial frequency noise, such as by constraining image capture based on a relative motion of the image sensor relative to a scene so that a pixel offset between sequential images due to the relative motion has a substantially integer value.

Using multiple-frame image stacking to generate the background frame and the target reference frame and generating the target image based on a difference between the background frame and the target reference frame enables removal of stationary or semi-stationary clutter in the image background. The clutter is reduced without reducing a peak target intensity, enabling higher accuracy in tracking and detection of targets as compared to systems that use linear filtering to reduce clutter. Additional techniques, such as match filtering and track-before-detection, can be used in conjunction with the resulting target images for further enhanced target tracking and detection.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple image frames are illustrated and associated with reference numbers 202A, 202B, etc. When referring to a particular one of these image frames, such as the image frame 202A, the distinguishing letter "A" is used. However, when referring to any arbitrary one of these image frames or to these image frames as a group, the reference number 202 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more processors ("processor(s)" 112 in FIG. 1), which indicates that in some implementations the system 100 includes a single processor 112 and in other implementations the system 100 includes multiple processors 112. For ease of reference herein, such features are generally introduced as "one or more" features, and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to perform image-based target tracking. The system 100 includes a device 102 that is coupled to an image sensor 104 and that is configured to perform image processing to track a target 106 in a field of view 105 of the image sensor 104. For example, in some implementations the device 102 and the image sensor 104 is mounted in a satellite, aircraft, or watercraft, as illustrative, non-limiting examples.

The device 102 and the image sensor 104 are interconnected via one or more networks to enable data communications. For example, the device 102 is coupled to the image sensor 104 via one or more wireless networks, one or more wireline networks, or any combination thereof. The device 102 and the image sensor 104 are co-located or geographically distributed from each other.

The device 102 includes a memory 114 coupled to one or more processors 112. The memory 114 includes a computer-readable medium that stores instructions 116 that are executable by the processor(s) 112 to initiate, perform or control operations to aid in image-based target tracking, as described in further detail below. The memory 114 is configured to store multiple image frames of a sequence of image frames 120 received from the image sensor 104, such as from video captured by the image sensor 104. Image frames of the sequence of image frames 120 include background features (e.g., terrain) and also include the target 106 moving through a scene 190. In an example where the image sensor 104 is aboard an aircraft or satellite, the scene 190 includes a background of geographical features and the target 106 includes an aircraft, watercraft, or land vehicle. The motion of the target 106 relative to the scene 190 is indicated by a movement path 108.

The processor(s) 112 includes a reference frame accumulator 130, a target frame accumulator 140, and a difference frame generator 150. In some implementations, the reference frame accumulator 130, the target frame accumulator 140, and the difference frame generator 150 are implemented at least in part by the processor 112 executing the instructions 116. In some implementations, the processor(s) 112 also include a noise estimator 160, a target delay unit 170, and a frame rate engine 180. The processor(s) 112 is implemented as a single processor or as multiple processors, such as in a multi-core configuration, a multi-processor configuration, a distributed computing configuration, a cloud computing configuration, or any combination thereof. In some implementations, one or more portions of the reference frame accumulator 130, the target frame accumulator 140, the difference frame generator 150, the noise estimator 160, the target delay unit 170, and the frame rate engine 180 are implemented by the processor 112 using dedicated hardware, firmware, or a combination thereof.

The reference frame accumulator 130 is configured to combine the image frames of a first group 122 of image frames of the sequence of image frames 120 to generate a reference frame 132. In some implementations, combining the first group 122 of image frames is performed by aligning the image frames to account for motion of the image sensor 104 relative to the scene 190 and, for each pixel of a particular image frame, adding or averaging the value of that pixel with the value of each corresponding pixel in each of the other image frames in the first group 122. In some implementations, the reference frame accumulator 130 is configured to perform a shift to pixels of one or more image frames of the first group 122 of image frames or to pixels of a reference accumulation frame that represents a partial accumulation of image frames of the first group 122 of image frames, such as described further with reference to FIGS. 2-5. In such implementations, the reference frame accumulator 130 is configured to perform an averaging or normalization operation to pixel values of the image frames of the first group 122, the reference accumulation frame, or a combination thereof.

The target frame accumulator 140 is configured to combine a second group 124 of image frames of the sequence of image frames 120 to generate a target frame 142. In some implementations, the target frame accumulator 140 is configured to perform a shift to pixels of one or more image frames of the second group 124 of image frames or to pixels of a target accumulation frame that represents a partial accumulation of the image frames of the second group 124 of image frames, such as described with reference to FIGS. 2-5. In such implementations, the target frame accumulator 140 is configured to perform an averaging or normalization operation to pixel values of the image frames of the second group 124, the target accumulation frame, or a combination thereof.

The difference frame generator 150 is configured to generate a difference frame 152. The difference frame 152 represents a difference between the target frame 142 and the reference frame 132. To illustrate, when the reference frame 132 represents an average of a relatively large number of image frames as compared to the target frame 142, the reference frame 132 is predominately indicative of stationary features of the scene 190 (although some pixels of the reference frame 132 that are along the movement path 108 are also partially indicative of the target 106, due to the target 106 temporarily obscuring the stationary features as it travels through the scene 190). In some implementations, the difference frame generator 150 generates the difference frame 152 by subtracting the reference frame 132 from the target frame 142. To illustrate, in some implementations each pixel of the difference frame 152 has a pixel value equal to the pixel value of the corresponding pixel in the target frame 142 minus the pixel value of the corresponding pixel in the reference frame 132. As a result, pixels in the difference frame 152 that correspond to background features in the target frame 142 have pixel values that are significantly reduced (or eliminated) as compared to the pixel(s) in the difference frame 152 that correspond to the location of the target 106 in the target frame 142.

The difference frame 152 provides a relatively high-contrast image of the target 106 (as captured in the second group 124 of image frames) against the background of the scene 190. By generating multiple difference frames 152 over time, the movement of the target 106 across the scene 190 can be detected and tracked, even in the presence of substantial background clutter.

In some implementations, the noise estimator 160, the target delay unit 170, the frame rate engine 180, or a combination thereof, are implemented by the processor(s) 112 to further enhance tracking accuracy. The noise estimator 160 is configured to determine fixed pattern noise data associated with the image sensor 104 and to perform pixel-by-pixel correction of each frame of the sequence of image frames 120. For example, in some implementations the noise estimator 160 performs two-point non-uniformity calibration and performs pixel-by-pixel correction on each image frame of the sequence of image frames 120 to remove or reduce effects of "high responder" pixels and to correct for mean sensor thermal self-emission.

Figure 2:
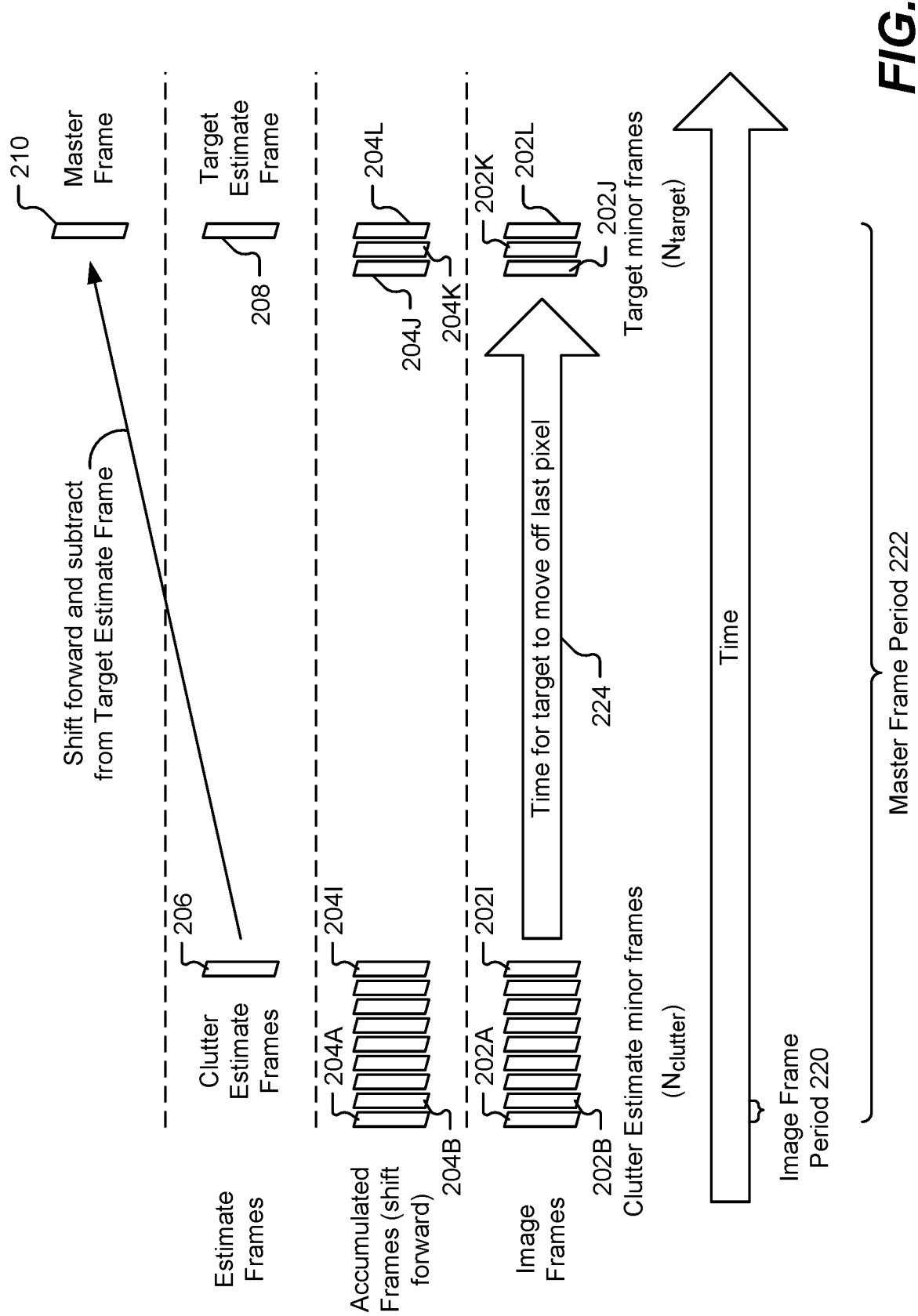
FIG. 2 is a diagram of a particular implementation of image-based target tracking that can be performed by the device of FIG. 1.
Figure 4:
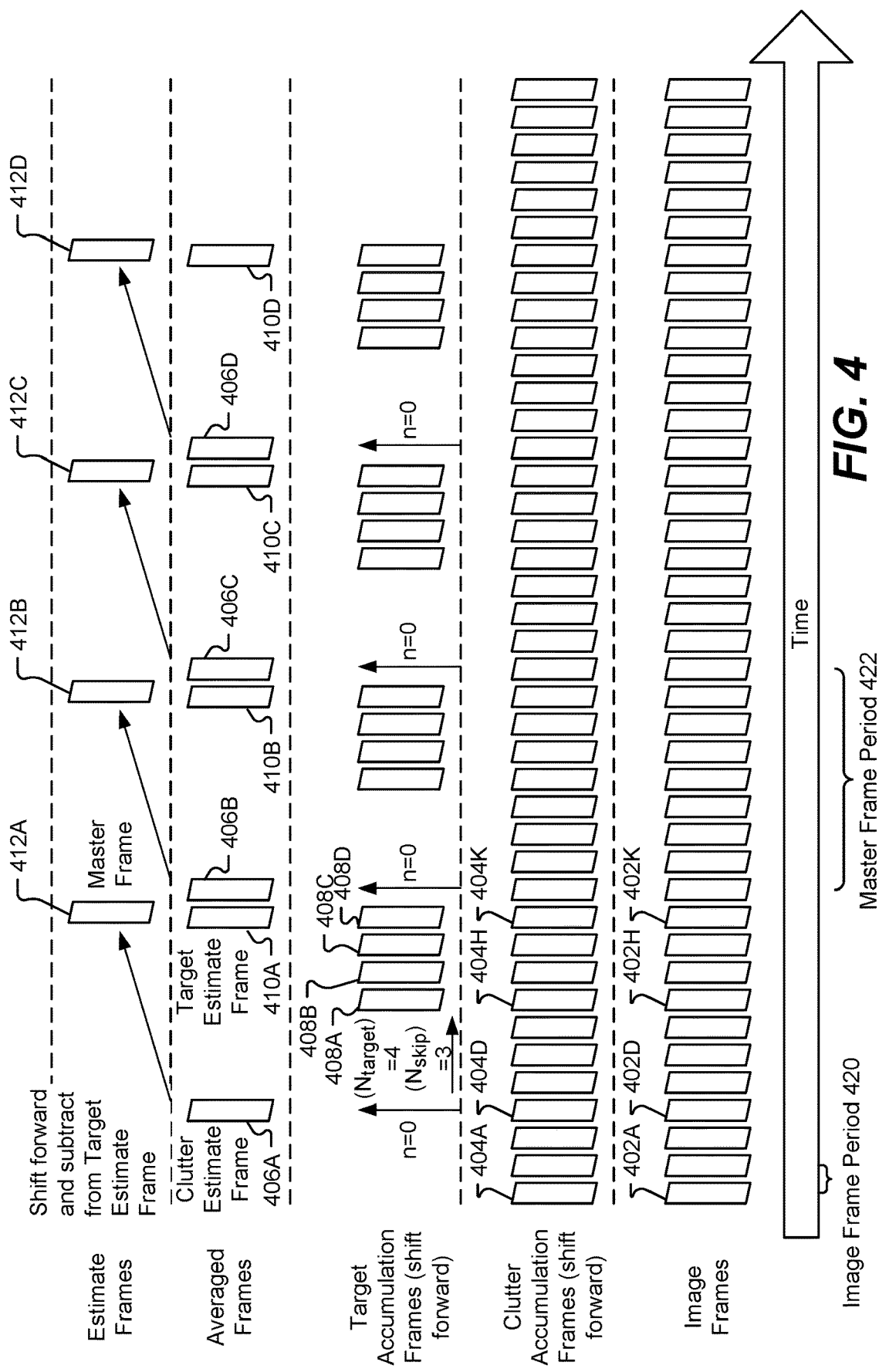
FIG. 4 is a diagram of another particular implementation of image-based target tracking that can be performed by the device of FIG. 1.

The target delay unit 170 is configured to determine a delay 172, in the sequence of image frames 120, between a sequentially last frame of the first group 122 of image frames and a sequentially first frame of the second group 124 of image frames, as illustrated in FIG. 2 and FIG. 4. In some implementations, the delay 172 is determined such that a separation is provided between positions of a moving object, such as the target 106, in the scene 190 captured in the first group 122 of image frames, and positions of the moving object in the scene 190 captured in the second group 124 of image frames. For example, in some implementations the delay 172 is based at least partially on a detected or estimated speed of movement of target 106 relative to a rate of image frame capture of the image sensor 104 so that the position of the target 106 in the sequentially first image frame of the second group 124 is offset by at least one pixel from the position of the target 106 in the sequentially last image frame of the first group 122.

The frame rate engine 180 is configured to determine a frame rate 182 of the image sensor 104 based on a relative motion 184 of the image sensor 104 relative to the scene 190 to reduce or minimize high-frequency spatial noise. The frame rate engine 180 sets the frame rate 182 so that sequential images captured by the image sensor 104 are offset relative to the scene 190 by an offset amount 186 that substantially matches an integer number of pixels. In some implementations, the frame rate engine 180 also generates sensor alignment information to align the image sensor 104 along the direction of relative motion of the image sensor 104 relative to the scene 190.

As an example, in an implementation in which the image sensor 104 has a rectangular array of photodetectors and the offset amount 186 is equal to one pixel, the frame rate engine 180 sets the frame rate 182 and sensor alignment information to control the orientation and operation of the array of photodetectors so that, after a feature of the scene 190 is captured by a first photodetector in a first row and a first column of the array when capturing a first image, the same feature of the scene 190 is captured by a second photodetector that is also in the first column and is in a second row adjacent to the first row when capturing a second image. Thus, as detected by the image sensor 104, features of the scene 190 move "vertically" by one row between image captures and do not move "horizontally" from column to column between image captures. Such alignment and timing of image capture based on the relative motion 184 can reduce the amount of processing resources and latency used by the reference frame accumulator 130, the target frame accumulator 140, or both, to align image frames to compensate for the relative motion 184 as compared to implementations in which features of the scene 190 shift by non-integer pixel amounts (vertically, horizontally, or both) between successive image captures.

During operation, the frame rate engine 180 generates sensor control information including the frame rate 182 based on the relative motion 184 and the offset amount 186 to reduce high-frequency spatial noise in the sequence of image frames 120. The sensor control information is sent to the image sensor 104 for use in generating image frames of the sequence of image frames 120. As image frames of the sequence of image frames 120 are received from the image sensor 104 by the device 102, the noise estimator 160 performs noise reduction processing of the image frames.

The reference frame accumulator 130 generates the reference frame 132 by performing multi-frame stacking to eliminate a semi-static background of the scene 190 by aligning (e.g., shifting by a number of pixels indicated by the offset amount 186) successive image frames in the first group 122 of image frames and accumulating, averaging, or otherwise combining the aligned image frames of the first group 122. After bypassing a number of image frames in the sequence of image frames 120 based on the delay 172, the target frame accumulator 140 performs multi-frame image stacking to generate the target frame 142 by aligning (e.g., shifting by a number of pixels indicated by the offset amount 186) successive image frames in the second group 124 of image frames and accumulating, averaging, or otherwise combining the aligned image frames of the second group 124. In some implementations, the difference frame generator 150 processes the reference frame 132 and the target frame 142 to generate the difference frame 152, a low-clutter, high-CNR target image that is provided to a target tracker or detector for further processing (e.g., at one or more other components of the device 102 or at another device that is communicatively coupled to the device 102).

By using multiple-frame image stacking to generate the reference frame 132 and the target frame 142 and by generating the difference frame 152 based on a difference between the reference frame 132 and the target frame 142, stationary or semi-stationary clutter in the scene 190 is removed or reduced without reducing a peak target intensity, enabling higher accuracy in tracking and detection of targets as compared to systems that use conventional techniques such as linear filtering to reduce clutter. In some implementations, additional techniques, such as match filtering and track-before-detection, are used in conjunction with the resulting target images for further enhanced target tracking and detection.

Although FIG. 1 depicts the image sensor 104 coupled to, or integrated with, the device 102, enabling the device 102 to control operation and orientation of the image sensor 104 (e.g., to reduce latency and processing resources used to generate the reference frame 132 and the target frame 142), in other implementations the image sensor 104 is not coupled to, or integrated with, the device 102. In an example, the sequence of image frames 120 is generated by the image sensor 104, stored, and provided to the device 102 for offline (e.g., non-real-time) processing. In such implementations, latency and processing resource constraints are typically relaxed as compared to real-time applications, such as for target tracking and detection performed at a satellite or aircraft. Although the frame rate engine 180 enables adjustment of the image sensor 104 image capture operations (e.g., frame rate 182, sensor orientation, or both) based on the relative motion 184, reducing processing resources used to stack image frames to generate the reference frame 132 and the target frame 142, in other implementations the frame rate engine 180 is omitted or bypassed for similar reasons as described above (e.g., for non-real-time applications).

Although the noise estimator 160 is described as providing noise reduction for each frame of the sequence of image frames 120, which enhances image frame accuracy and therefore accuracy of target tracking and detection, in other implementations the device 102 omits the noise estimator 160 or is configured to selectively bypass operation of the noise estimator 160. In an illustrative example, noise reduction is provided based on one-time calibration data performed by a manufacturer of the image sensor 104 and stored in the memory 114. In another illustrative example, the noise estimator 160 is bypassed or omitted in implementations in which effects of fixed pattern noise on target tracking and detection are determined to be relatively small (e.g., a target detection performance metric is satisfied without use of the noise estimator 160) or in implementations in which a processing cost or latency associated with correcting for fixed pattern noise is determined to outweigh an improvement in target tracking and detection resulting from correcting for the fixed pattern noise, as illustrative, non-limiting examples.

Although the target delay unit 170 is described as determining the delay 172, in other implementations the target delay unit 170 is omitted or bypassed. As described previously, enhanced results are attained by the delay 172 being long enough to provide a high probability that the position of the target 106 has shifted by one or more pixels between the end of the first group 122 and the beginning of the second group 124 (to enable the difference frame generator 150 to more accurately distinguish the target 106 from background clutter). Conversely, target detection and tracking are generally improved by reducing the latency between generation of each successive difference frame 152 and are therefore negatively impacted by increasing the length of the delay 172. In some implementations, using the target delay unit 170 to determine the delay 172 to balance such competing criteria improves overall system performance. However, in other implementations the delay 172 is set to a predetermined value (e.g., based on factory calibration or empirical or simulated testing) and stored in the memory 114 without adjustment during operation the device 102.

Although the reference frame accumulator 130, the target frame accumulator 140, the difference frame generator 150, the noise estimator 160, the target delay unit 170, and the frame rate engine 180 are depicted as separate components, in other implementations the described functionality of two or more of the reference frame accumulator 130, the target frame accumulator 140, the difference frame generator 150, the noise estimator 160, the target delay unit 170, and the frame rate engine 180 is performed by a single component. In some implementations, each of the reference frame accumulator 130, the target frame accumulator 140, the difference frame generator 150, the noise estimator 160, the target delay unit 170, and the frame rate engine 180 is represented in hardware, such as via an application-specific integrated circuit (ASIC) or a field-programmable gate array (FPGA), or the operations described with reference to the elements may be performed by a processor executing computer-readable instructions.

Figure 3:
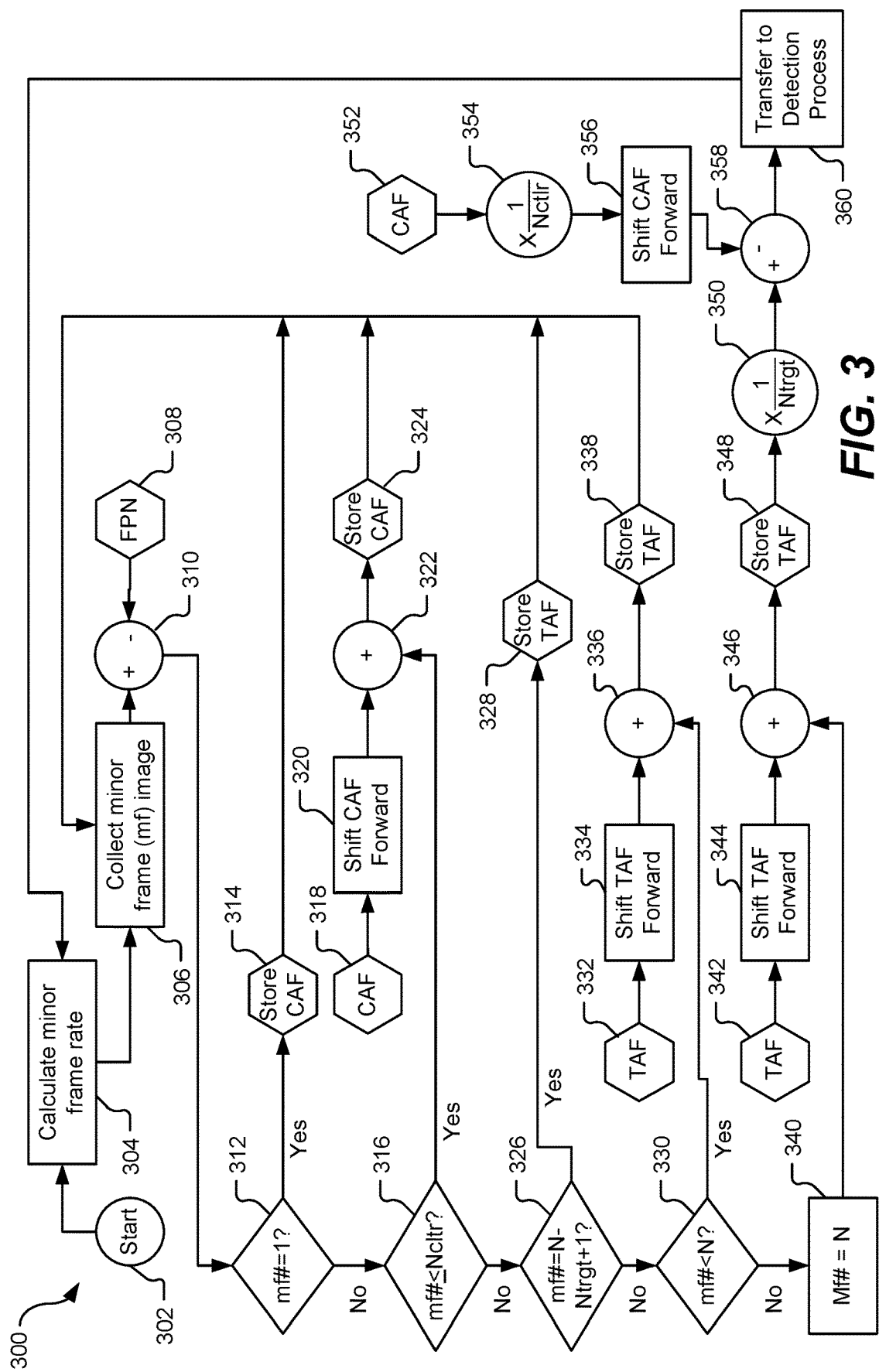
FIG. 3 is a diagram that illustrates a flow chart of an example of a method of image-based target tracking that can be performed by the device of FIG. 1.
Figure 5:
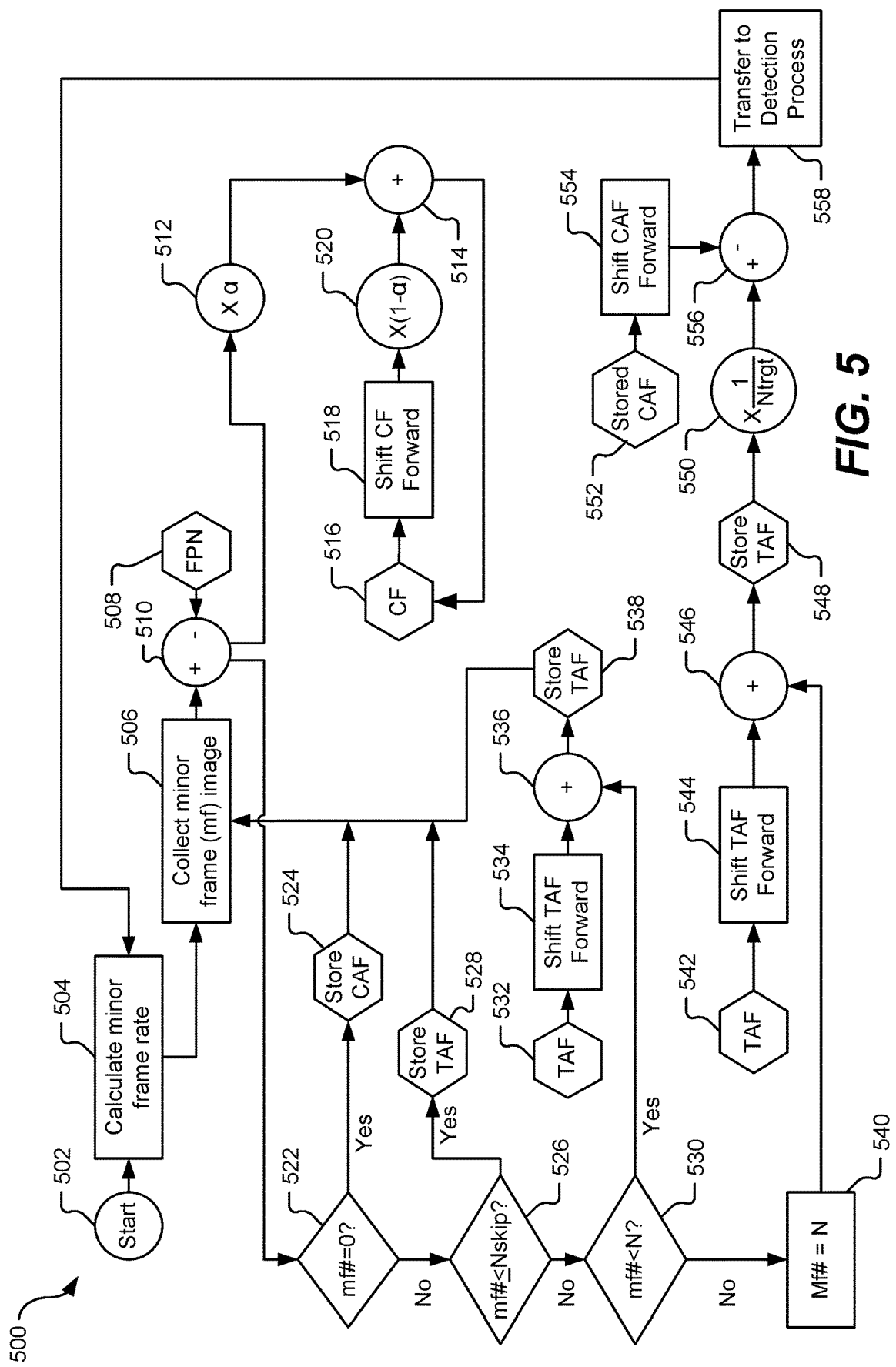
FIG. 5 is a diagram that illustrates a flow chart of another example of a method of image-based target tracking that can be performed by the device of FIG. 1.

FIGS. 2-3 illustrate a first implementation of image-based target tracking using discrete groups of image frames for clutter estimates, and FIGS. 4-5 illustrate a second implementation of image-based target tracking using recursive estimates of clutter. In an illustrative example, each of the implementations illustrated in FIGS. 2-5 is performed by the device 102 of FIG. 1.

In FIG. 2, a sequence of image frames 202 includes a first group (e.g., the first group 122 of FIG. 1) that includes image frames 202A-202I and a second group (e.g., the second group 124 of FIG. 1) that includes image frames 202J-202L. The first group of image frames 202A-202I is separated from the second group of image frames 202J-202L by one or more image frames (not shown) during a time period 224 (e.g., the delay 172). Each of the image frames 202 is temporally separated from adjacent image frames 202 according to an image frame period 220 (e.g., based on image capture by the image sensor 104 according to the frame rate 182) that corresponds to integer pixel shifts in the background reference frame.

The first group of image frames 202A-202I is used to generate a first group of accumulated frames 204A-204I. In an example, the first accumulated frame 204A matches the first image frame 202A, and the second accumulated frame 204B is generated by shifting the first accumulated frame 204A to compensate for sensor motion (e.g., shifting by the offset amount 186 of pixels to offset for the relative motion 184) and adding the second image frame 202B to the shifted first accumulated frame 204A. The last accumulated frame 204I of the first group of accumulated frames 204A-204I is used as a clutter estimate frame 206. In an example, the clutter estimate frame 206 corresponds to the reference frame 132 of FIG. 1.

Similarly, the second group of image frames 202J-202L is used to generate a second group of accumulated frames 204J-204L. In an example, the accumulated frame 204J matches the image frame 202J, and the accumulated frame 204K is generated by shifting the accumulated frame 204J to compensate for sensor motion and adding the image frame 202K to the shifted version of the accumulated frame 204J. The last accumulated frame 204L of the second group of accumulated frames 204J-204L is used as a target estimate frame 208. In an example, the target estimate frame 208 corresponds to the target frame 142 of FIG. 1. In some implementations, a master frame 210 is generated by subtracting the clutter estimate frame 206 from the target estimate frame 208 after performing a shift to compensate for sensor motion. In an illustrative example, the master frame 210 corresponds to the difference frame 152 of FIG. 1.

A master frame period 222 indicates a time between successively generated master frames. The master frame period 222 is substantially equal to the sum of a first time to generate the first group of image frames 202A-202I, the time period 224, and a second time to generate the second group of image frames 202J-202L. The first group of image frames 202A-202I includes a first number of image frames ("$N_{clutter}$"), the second group of image frames 202J-202L includes a second number of image frames ("$N_{target}$"), and the master frame period 222 is expressed as: (master frame period 222)=(image frame period 220)*($N_{clutter}+N_{target}$)+ (time period 224).

In some implementations, the image frame period 220 is selected to correspond to integer pixel shifts in the background reference frame to reduce or eliminate high-spatial-frequency clutter from "bleeding through" to the master frame 210. In addition, a sensor axis (e.g., sensor array rows or columns) are substantially aligned to a ground motion direction (e.g., an image sensor array is oriented as described with reference to the frame rate engine 180 and the image sensor 104 of FIG. 1). Although FIG. 2 illustrates $N_{target}=3$ and $N_{clutter}=9$, these values are provided for purposes of illustration and are not limiting. Instead, in some implementations, values of $N_{target}$ and $N_{clutter}$ are changed based on the ground motion, the image frame period 220, and an anticipated speed (or an upper bound and a lower bound of a range of speeds) of a target. In some examples, $N_{target}$ is selected as a largest number of image frames that keeps a target on a same ground pixel (e.g., the shifted pixel position of a target features is unchanged in each of the image frames 202J-202L) to drive down shot noise in the target estimate frame 208. In some examples, $N_{clutter}$ is selected to "smear" the target location over multiple pixels in the clutter estimate frame 206 and to drive down shot noise in the clutter estimate frame 206.

FIG. 3 depicts a data flow process 300 that can be implemented by the device 102 to perform the image-based target tracking of FIG. 2. The process 300 starts, at 302, and a minor frame rate (corresponding to the image frame period 220) is calculated, at 304. In some implementations, the minor frame rate is determined as described with reference to the frame rate 182 of FIG. 1. The minor frame rate is used to control an image sensor to collect a next minor frame ("mf") image (e.g., a next image frame of the image frames 202), at 306. The minor frame is assigned an index ("mf #") based on its location within the master frame period 222. For example, the image frame 202A has index=1, the image frame 202I has index=$N_{clutter}$, and the image frame 202J has index=$N-N_{target}+1$ (where N is an integer indicating the total number of image frames 202 in the master frame period 222).

Fixed pattern noise reduction is performed on the minor frame image by determining fixed pattern noise ("FPN") data 308 and subtracting the fixed pattern noise data 308 from the minor frame image, at 310, to generate a noise-reduced minor image frame. In some implementations, the fixed pattern noise data 308 is generated by the noise estimator 160 of FIG. 1.

A determination is made as to whether the index of the minor frame is 1, at 312. If the index of the minor frame is 1, the noise-reduced minor frame is stored as a clutter accumulation frame ("CAF") (e.g., the accumulated frame 204A), at 314, and processing returns to collecting a next minor frame image, at 306.

Otherwise, if the index of the minor frame is greater than 1 and is less than or equal to $N_{clutter}$, at 316, the clutter accumulation frame is accessed, at 318, and pixels (e.g., one or more pixel rows of a rectangular array of pixels) of the clutter accumulation frame are shifted forward to compensate for motion of the image sensor relative to the background, at 320, substantially aligning the pixels of the clutter accumulation frame with pixels of the noise-reduced minor frame. The clutter accumulation frame and the noise-reduced minor frame are combined, at 322, to generate a combined frame that is stored as an updated clutter accumulation frame, at 324, and processing returns to collecting a next minor frame image, at 306.

If the index of the minor frame is not less than or equal to $N_{clutter}$, at 316, a determination is made as to whether the index of the minor frame is equal to ($N-N_{target}+1$), at 326. If the index of the minor frame is equal to $N-N_{target}+1$ (e.g., the minor frame corresponds to the image frame 202J), the noise-reduced minor frame is stored as a target accumulation frame ("TAF") (e.g., the accumulated frame 204J), at 328, and processing returns to collecting a next minor frame image, at 306.

If the index of the minor frame is not equal to N−N$_{target}$+1, at 326, a determination is made as to whether the index of the minor frame is less than N, at 330. If the index of the minor frame is less than N, at 330, the target accumulation frame is accessed, at 332, and pixels (e.g., one or more pixel rows of a rectangular array of pixels) of the target accumulation frame are shifted forward to compensate for motion of the image sensor relative to the background, at 334, substantially aligning the pixels of the target accumulation frame with pixels of the noise-reduced minor frame. The target accumulation frame and the noise-reduced minor frame are combined, at 336, to generate a combined frame that is stored as an updated target accumulation frame, at 338, and processing returns to collecting a next minor frame image, at 306.

If the index of the minor frame is not less than N, at 330, a determination is made that the index of the minor frame is equal to N (e.g., the minor frame corresponds to the final image frame 202L of the master frame period 222), at 340. The target accumulation frame is accessed, at 342, and pixels of the target accumulation frame are shifted forward to compensate for motion of the image sensor relative to the background, at 344. The target accumulation frame and the noise-reduced minor frame are combined, at 346, to generate a combined frame (e.g., the target estimate frame 208) that is stored as the target accumulation frame, at 348.

An averaging or normalization operation 350 is performed on the target accumulation frame by dividing each pixel value of the updated target accumulation frame by N$_{target}$ (the number of frames used to generate the target accumulation frame), to generate an average target accumulation frame. The clutter accumulation frame is also accessed, at 352, and an averaging or normalization operation 354 is performed on the clutter accumulation frame by dividing each pixel value of the clutter accumulation frame by N$_{clutter}$ (the number of frames used to generate the clutter accumulation frame), to generate an average clutter accumulation frame. The average clutter accumulation frame is shifted forward, at 356, to compensate for motion of the image sensor relative to the background that has occurred since capture of the image frame with index=N$_{clutter}$.

The shifted average clutter accumulation frame is subtracted from the average target accumulation frame, at 358, to generate a master frame (e.g., the master frame 210). The master frame is transferred to a detection process, at 360, and processing returns to calculating a next minor frame rate, at 304. In some implementations, the master frame is provided to a constant false alarm rate (CFAR)-type process to perform target detection based on the sequence of master frames generated by the process 300.

FIGS. 4-5 illustrate a second implementation of image-based target tracking using recursive estimates of clutter. In FIG. 4, a sequence of image frames 402 are used to generate clutter accumulation frames 404 and target accumulation frames 408. In contrast to FIG. 2, each of the clutter accumulation frames 404 is generated using a recursive image filter with alignment shifts to continuously estimate the clutter frame.

Each of the image frames 402 is temporally separated from adjacent image frames 402 according to an image frame period 420 (e.g., based on image capture by the image sensor 104 according to the frame rate 182) that corresponds to integer pixel shifts in the background reference frame.

The clutter accumulation frames 404 are recursively generated based on the image frames 402 and prior clutter accumulation frames 404. For example, as explained in further detail with reference to FIG. 5, a clutter accumulation frame 404D is a weighted sum of the corresponding image frame 402D and the previous clutter accumulation frame 404C, the previous clutter accumulation frame 404C is a weighted sum of the corresponding image frame 402C and the previous clutter accumulation frame 404B, etc. Rather than using a discrete starting frame and ending frame to delineate a group of image frames to generate a reference frame (e.g., by equally weighting image frames starting at image frame 202A and ending at image frame 202I to generate the clutter estimate frame 206 of FIG. 2), each of the clutter accumulation frames 404 represents a group of the image frames 402 whose respective contributions to the clutter accumulation frame 404 diminish as temporal distance from the clutter accumulation frame increases. Any of the clutter accumulation frames 404 are selectable for use as a clutter estimate frame 406. In some implementations, each of the clutter estimate frames 406 corresponds to the reference frame 132 of FIG. 1.

Target accumulation frames 408 are generated based on discrete groups of the image frames 402 and are used to generate target estimate frames 410 in a similar manner as described with reference to generating the target estimate frame 208 of FIG. 2. For example, a group of image frames 402H-404K are used to generate a target estimate frame 410A. The target accumulation frame 408A matches the image frame 402H, and the target accumulation frame 408B is generated by shifting the target accumulation frame 408A to compensate for sensor motion and adding the image frame 402I to the shifted version of the target accumulation frame 408A. The target accumulation frame 408C is generated by shifting the target accumulation frame 408B to compensate for sensor motion and adding the image frame 402J to the shifted version of the target accumulation frame 408B. The target accumulation frame 408D is generated by shifting the target accumulation frame 408C to compensate for sensor motion and adding the image frame 402K to the shifted version of the target accumulation frame 408C. The target accumulation frame 408D is used as the target estimate frame 410A. In some implementations, a master frame 412A is generated by subtracting the clutter estimate frame 406A from the target estimate frame 410A. In some implementations, the master frame 412A corresponds to the difference frame 152 of FIG. 1.

A master frame period 422 indicates a time between successively generated master frames 412. The master frame period 222 is substantially equal to the sum of a "skip" time (e.g., the delay 172 of FIG. 1) and a second time for generating a target estimate frame 410. In the illustrated example of FIG. 4, the master frame 412A is generated by selecting the clutter accumulation frame 404D to be used as the clutter estimate frame 406A. After skipping a predetermined number ("N$_{skip}$") of image frames, the target accumulation frames 408A-408D are generated based on the group of image frames 402H-402K, and the target accumulation frame 408D is used as the target estimate frame 410A. The master frame 412A is generated after N$_{skip}$+N$_{target}$ image frames 402 for selection of the clutter accumulation frame 404D (e.g., at frame count n=0). The master frame period 422 is expressed as: (master frame period 422)= (image frame period 420)*(N$_{skip}$+N$_{target}$). The master frame period 422 can be shorter than the master frame period 222 of FIG. 2 by removing latency (e.g., N$_{clutter}$) associated with generating the clutter estimate frame 206. In other words, the recursive estimate of the clutter is decoupled from the target frame generation and does not impact the master frame period 422.

In some implementations, the image frame period 420 is selected to correspond to integer pixel shifts in the background reference frame to reduce or eliminate high-spatial-frequency clutter from "bleeding through" to the master frames 412, and a sensor axis (e.g., sensor array rows or columns) is substantially aligned to a ground motion direction (e.g., an image sensor array is oriented as described with reference to the frame rate engine 180 of FIG. 1). Although FIG. 4 illustrates $N_{target}=4$ and $N_{skip}=3$, these values are provided for purposes of illustration and are not limiting. Instead, in some implementations, values of $N_{target}$ and $N_{skip}$ are changed based on the ground motion, the image frame period 420, and an anticipated speed (or an upper bound and a lower bound of a range of speeds) of a target. In an example, $N_{target}$ is selected as a largest number of image frames that keeps a target on a same ground pixel (e.g., the shifted pixel position of a target features is unchanged in each of the image frames 402H-402K) to drive down shot noise in the target estimate frame 410. In some implementations, $N_{skip}$ is selected to allow additional time for a target to move away from a pixel position of the target in the clutter estimate frame 406. In some implementations, $N_{skip}$ has a value of 0.

Although FIG. 4 depicts each master frame 412 being generated by repeating a sequence that includes: (1) selecting a clutter estimate frame 406 (and resetting an image frame count to n=0); (2) skipping $N_{skip}$ image frames; and (3) generating a target estimate frame 410 based on the next $N_{target}$ image frames, in other implementations multiple instances of this sequence are interleaved. For example, rather than waiting for the master frame 412B to be generated before starting a next iteration of the sequence to generate the master frame 412C, in some implementations the next iteration of the sequence to generate the master frame 412C is started prior to generating the master frame 412B. For example, some implementations include a fully interleaved configuration having sufficient processing resources to generate a new master frame 412 for each minor frame period 420.

FIG. 5 depicts a data flow process 500 that can be implemented by the device 102 to perform the image-based target tracking FIG. 4. The process 500 starts, at 502, and a minor frame rate (corresponding to the image frame period 420) is calculated, at 504. In an example, the minor frame rate is determined as described with reference to the frame rate 182 of FIG. 1. The minor frame rate is used to control an image sensor to collect a next minor frame image (e.g., a next image frame of the image frames 402), at 506. The minor frame is assigned an index ("mf #") based on its location within the master frame period 422. For example, the minor frame 402D has index=0, the minor frame 402H has index=$N_{skip}$, and the minor frame 402K has index=N (where N is an integer indicating a total number of image frames 402 in the master frame period 422).

Fixed pattern noise reduction is performed on the minor frame image, at 510, by subtracting fixed pattern noise data 508 from the minor frame image to generate a noise-reduced minor image frame. In some implementations, the fixed pattern noise data 508 is generated by the noise estimator 160 of FIG. 1.

The minor frame is used to recursively generate an updated clutter frame in a series of operations that include a scaling (e.g., multiplying) operation 512 to scale the noise-reduced minor frame by a weighting factor "a" and an adding operation 514 to add the scaled minor frame to a scaled shifted version of a stored clutter frame. For example, the stored clutter frame ("CF") is accessed, at 516, and a shifting operation 518 is performed to shift pixels (e.g., one or more pixel rows of a rectangular array of pixels) of the clutter frame forward to compensate for motion of the image sensor relative to the background, substantially aligning the pixels of the clutter frame with pixels of the scaled minor frame. A scaling operation 520 scales the shifted clutter frame by a weighting factor "$(1-\alpha)$" to generate the scaled shifted version of the clutter frame. After combining the scaled minor frame and the scaled shifted version of the clutter frame, at 514, the result is stored as an updated clutter frame, at 516. The operations 512-520 represent an illustrative example of the recursive clutter frame update described with reference to FIG. 4.

The process 500 also includes determining if the index of the minor frame is 0, at 522. In response to the index of the minor frame equaling 0, the noise-reduced minor frame is stored as a clutter accumulation frame (e.g., the clutter estimate frame 406A), at 524, and processing returns to collecting a next minor frame image, at 506.

Otherwise, if the index of the minor frame is greater than 0 and is determined to be less than or equal to $N_{skip}$, at 526, the noise-reduced minor frame is stored as a target accumulation frame (e.g., the target accumulation frame 408A), at 528, and processing returns to collecting a next minor frame image, at 506.

If the index of the minor frame is not less than or equal to $N_{skip}$, at 526, a determination is made as to whether the index of the minor frame is less than N, at 530. If the index of the minor frame is less than N, at 530, the target accumulation frame is accessed, at 532, and pixels (e.g., one or more pixel rows of a rectangular array of pixels) of the target accumulation frame are shifted forward to compensate for motion of the image sensor relative to the background, at 534, substantially aligning the pixels of the target accumulation frame with pixels of the noise-reduced minor frame. The target accumulation frame and the noise-reduced minor frame are combined, at 536, to generate a combined frame that is stored as an updated target accumulation frame, at 538, and processing returns to collecting a next minor frame image, at 506.

If the index of the minor frame is not less than N, at 530, a determination is made that the index of the minor frame is equal to N (e.g., the minor frame corresponds to the final image frame 402K), at 540. The target accumulation frame is accessed, at 542, and pixels of the target accumulation frame are shifted forward to compensate for motion of the image sensor relative to the background, at 544. The target accumulation frame and the noise-reduced minor frame are combined, at 546, to generate a combined frame (e.g., the target estimate frame 410A) that is stored as the target accumulation frame, at 548.

An averaging or normalization operation 550 is performed on the target accumulation frame by dividing each pixel value of the updated target accumulation frame by $N_{target}$ (the number of frames used to generate the target accumulation frame), to generate an average target accumulation frame. The clutter accumulation frame is also accessed, at 552, and shifted forward, at 554, to compensate for motion of the image sensor relative to the background that has occurred since capture of the image frame with index=0.

The shifted clutter accumulation frame is subtracted from the average target accumulation frame, at 556, to generate a master frame (e.g., the master frame 412A). The master frame is transferred to a detection process, at 558, and processing returns to calculating a next minor frame rate, at 504. In some implementations, the master frame is provided to a CFAR-type process to perform target detection based on the sequence of master frames generated by the process 500.

Although examples described with reference to FIGS. 1-5 include shifting accumulation frames forward to align the accumulation frames with image frames, in other examples the image frames are instead shifted "backward" to align with the accumulation frames. Alternatively, in some implementations the image frames and the accumulation frames are shifted to achieve alignment. Although various examples describe a using shift amount of one pixel to align sequential frames, in other implementations other integer shift amounts are used to perform alignment. In some implementations, sequential frames are misaligned by a fractional integer amount (e.g., the background image moves by one-half pixel in each sequential image frame) and frame alignment includes sampling a subset of the frames (e.g., selecting every second image frame so that the background moves by one pixel in sequential image frames of the subset) and using an integer number of pixels to shift the frames in the subset of frames.

Figure 6A:
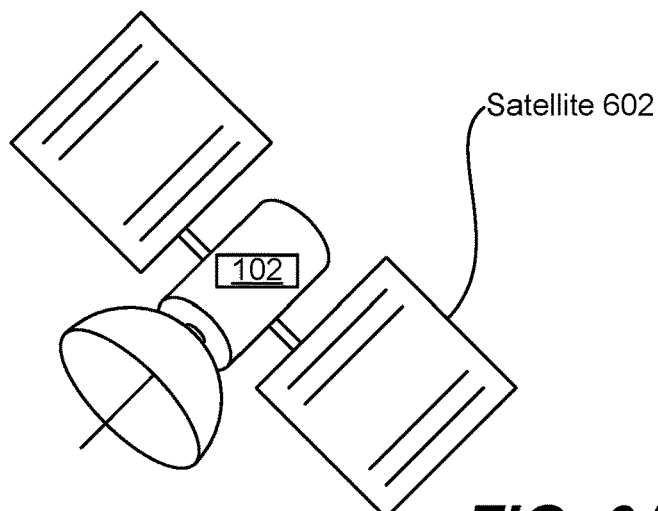
FIG. 6A is a diagram depicting another example of a system that includes the device of FIG. 1.
Figure 6B:
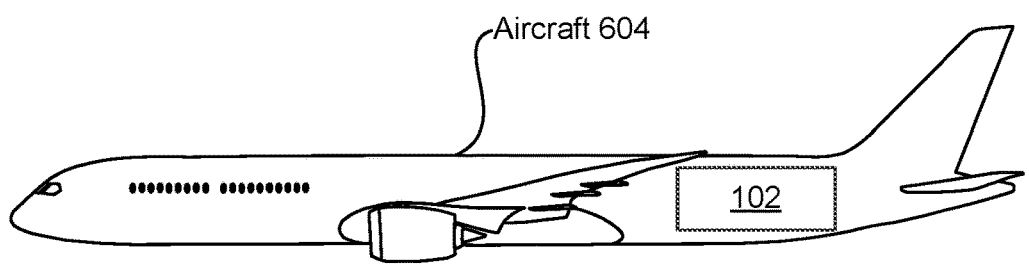
FIG. 6B is a diagram depicting another example of a system that includes the device of FIG. 1.
Figure 6C:
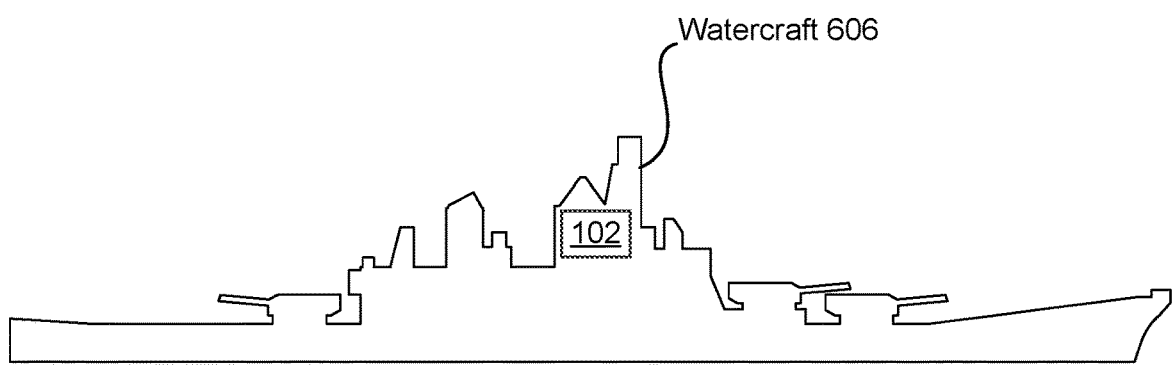
FIG. 6C is a diagram depicting another example of a system that includes the device of FIG. 1.

FIGS. 6A-6C depicts multiple examples of systems that include the device 102 (and the image sensor 104). FIG. 6A depicts the device 102 in a spacecraft such as a satellite 602. FIG. 6B depicts the device 102 in an aircraft 604. FIG. 6C depicts the device 102 in a watercraft 606. However, in other implementations the device 102 is not implemented in a vehicle. For example, in some implementations the device 102 and the image sensor 104 are implemented at a stationary structure (e.g., an air traffic control tower) to detect higher-speed moving targets (e.g., aircraft) against a lower-speed moving background (e.g., clouds).

Figure 7:
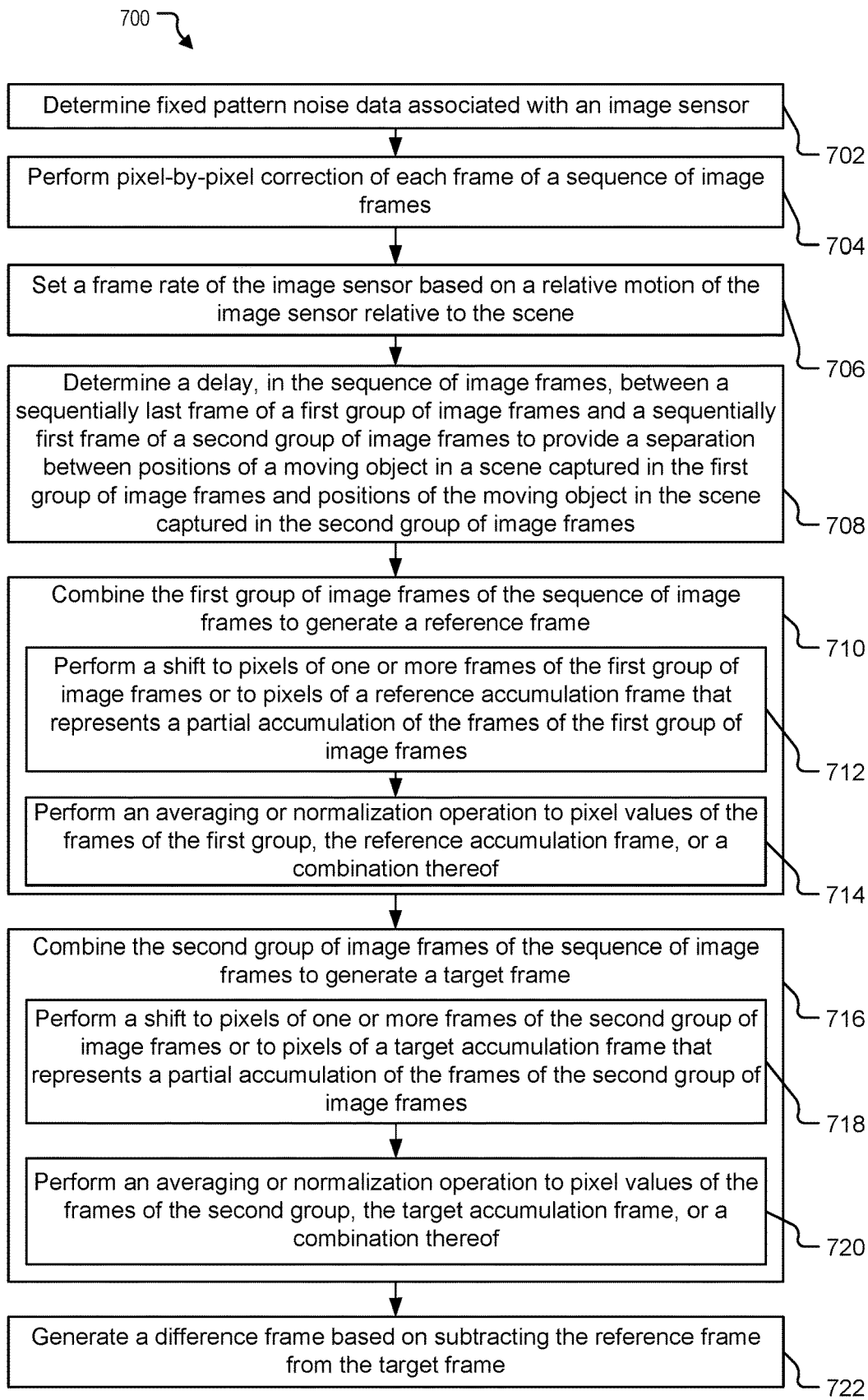
FIG. 7 is a diagram that illustrates a flow chart of another example of a method of image-based target tracking that can be performed by the device of FIG. 1.

FIG. 7 depicts an illustrative implementation of a method 700 for image processing. In an example, the method 700 is performed by the device 102 of FIG. 1 to perform image-based target tracking.

The method 700 includes determining fixed pattern noise data associated with an image sensor, at 702. In some implementations, the fixed pattern noise data is determined by the noise estimator 160 of FIG. 1. The method 700 also includes performing pixel-by-pixel correction of each frame of a sequence of image frames, at 704, such as described with reference to the fixed pattern noise of FIG. 3 or FIG. 5. In some implementations, the sequence of image frames is received from an image sensor, such as the image sensor 104 of FIG. 1, and corresponds to a scene, such as the scene 190.

The method 700 includes setting a frame rate of the image sensor based on a relative motion of the image sensor relative to the scene, at 706. In an illustrative example, the frame rate corresponds to the frame rate 182 that is determined by the frame rate engine 180 of FIG. 1. In some implementations, the frame rate is determined so that sequential images are offset relative to the scene by an offset amount that substantially matches an integer number of pixels.

The method 700 includes determining a delay, in the sequence of image frames, between a sequentially last frame of a first group of image frames and a sequentially first frame of a second group of image frames to provide a separation between positions of a moving object in the scene captured in the first group of image frames and positions of the moving object in the scene captured in the second group of image frames, at 708. In some implementations, the delay corresponds to the delay 172 determined by the target delay unit 170 of FIG. 1. Alternatively, or in addition, in some implementations, the delay corresponds to the time period 224 of FIG. 2, a delay associated with $N_{skip}$ of FIG. 4, or a combination thereof.

The method 700 includes combining the first group of image frames of the sequence of image frames to generate a reference frame, at 710. For example, the method 700 includes performing a shift to pixels of one or more frames of the first group of image frames (e.g., the first group 122 of FIG. 1) or to pixels of a reference accumulation frame (e.g., one or more of the accumulated frames 204A-204I of FIG. 2 or one or more of the clutter accumulation frames 404 of FIG. 4) that represents a partial accumulation of the frames of the first group of image frames, at 712. The method 700 also includes performing an averaging or normalization operation to pixel values of the frames of the first group, the reference accumulation frame, or a combination thereof, at 714. In some implementations, the averaging or normalization operation includes dividing by a number of frames used to generate the reference frame, such as described with reference to the averaging or normalization operation 354 of FIG. 3. In other implementations, the averaging or normalization operation includes applying a weighted sum operation, such as described with reference to the operations 512 and 520 of FIG. 5.

The method 700 includes combining the second group of image frames of the sequence of image frames to generate a target frame, at 716. For example, the method 700 includes performing a shift to pixels of one or more frames of the second group of image frames (e.g., the second group 124 of FIG. 1) or to pixels of a target accumulation frame (e.g., one or more of the accumulated frames 204J-204L of FIG. 2 or one or more of the target accumulation frames 408A-408D of FIG. 4) that represents a partial accumulation of the frames of the second group of image frames, at 718. The method 700 includes performing an averaging or normalization operation to pixel values of the frames of the second group, the target accumulation frame, or a combination thereof, at 720. In some implementations, the averaging or normalization operation includes dividing by a number of frames used to generate the target frame, such as described with reference to the averaging or normalization operation 350 of FIG. 3 or the averaging or normalization operation 550 of FIG. 5.

The method 700 includes generating a difference frame based on subtracting the reference frame from the target frame, at 722. For example, difference frame generator 150 generates the difference frame 152 of FIG. 1 based on subtracting the reference frame 132 from the target frame 142.

By using multiple-frame combining to generate the reference frame and the target frame and by generating the difference frame based on subtracting the reference frame from the target frame, the method 700 reduces or removes stationary or semi-stationary clutter without reducing a peak target intensity, enabling higher accuracy in tracking and detection of targets as compared to methods that use conventional techniques such as linear filtering to reduce clutter. Additional techniques, such as match filtering and track-before-detection, can be used in conjunction with the resulting target images for further enhanced target tracking and detection.

Figure 8:
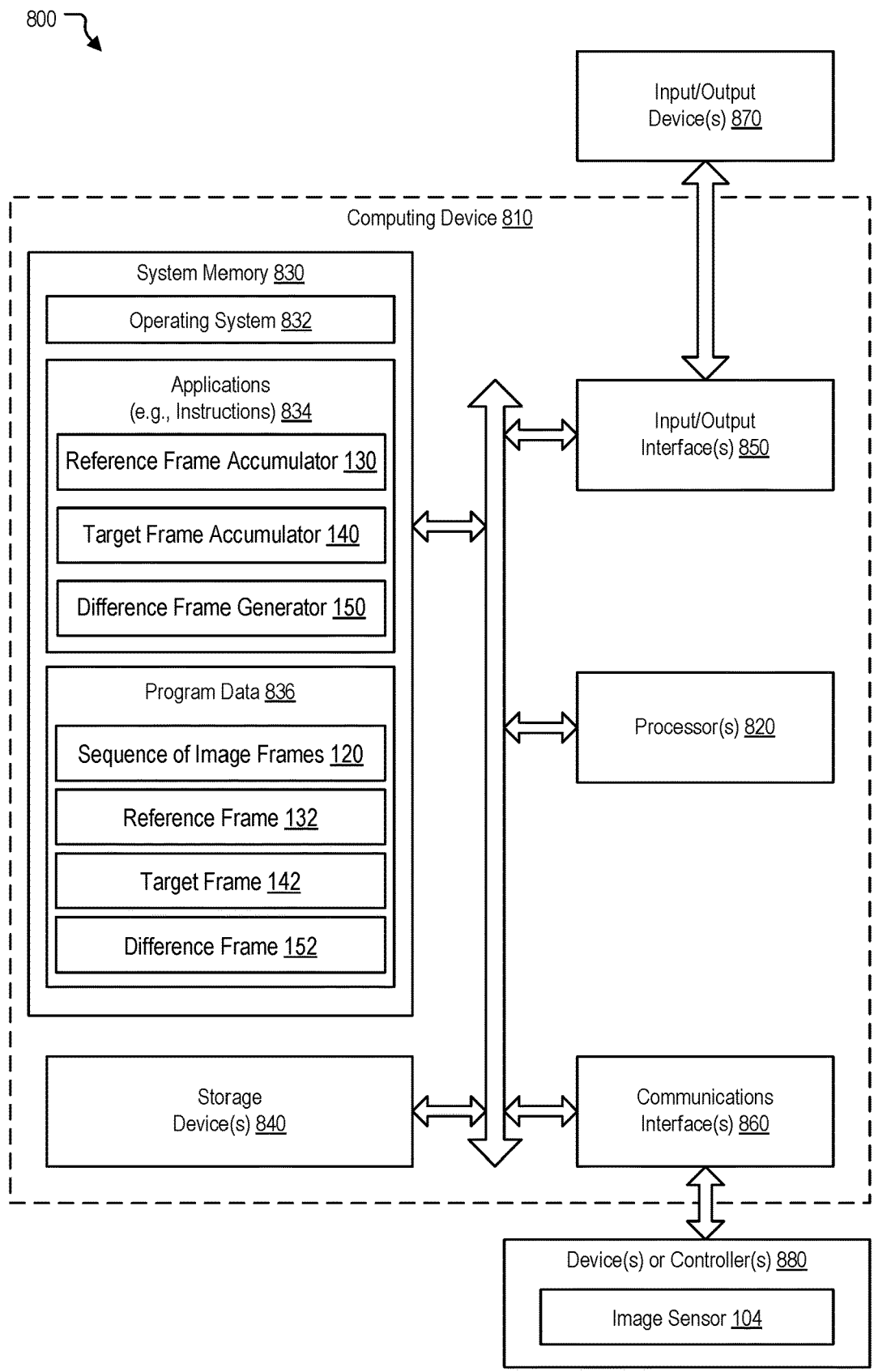
FIG. 8 is a block diagram of a computing environment including a computing device configured to support aspects of computer-implemented methods and computer-executable program instructions (or code) according to the present disclosure.

FIG. 8 is a block diagram of a computing environment 800 including a computing device 810 configured to support aspects of computer-implemented methods and computer-executable program instructions (or code) according to the present disclosure. For example, the computing device 810, or portions thereof, is configured to execute instructions to initiate, perform, or control one or more operations described with reference to FIGS. 1-7. In a particular implementation, the computing device 810 corresponds to the device 102 of FIG. 1.

The computing device 810 includes one or more processors 820. The processor(s) 820 are configured to communicate with system memory 830, one or more storage devices 840, one or more input/output interfaces 850, one or more communications interfaces 860, or any combination thereof. The system memory 830 includes volatile memory devices (e.g., random access memory (RAM) devices), nonvolatile memory devices (e.g., read-only memory (ROM) devices, programmable read-only memory, and flash memory), or both. The system memory 830 stores an operating system 832, which may include a basic input/output system for booting the computing device 810 as well as a full operating system to enable the computing device 810 to interact with users, other programs, and other devices. The system memory 830 stores system (program) data 836, such as the sequence of image frames 120 of FIG. 1, one or more accumulation frames, the reference frame 132, the target frame 142, the difference frame 152, or a combination thereof.

The system memory 830 includes one or more applications 834 (e.g., sets of instructions) executable by the processor(s) 820. As an example, the one or more applications 834 include instructions executable by the processor(s) 820 to initiate, control, or perform one or more operations described with reference to FIGS. 1-7. To illustrate, the one or more applications 834 include instructions executable by the processor(s) 820 to initiate, control, or perform one or more operations described with reference to the reference frame accumulator 130, the target frame accumulator 140, and the difference frame generator 150, or a combination thereof.

In a particular implementation, the system memory 830 includes a non-transitory, computer readable medium storing the instructions that, when executed by the processor(s) 820, cause the processor(s) 820 to initiate, perform, or control operations to perform image processing. The operations include combining a first group of image frames of a sequence of image frames to generate a reference frame (such as by shifting and adding frames as depicted in FIG. 3 or by a performing recursive operation or weighted sum as depicted in FIG. 5), combining a second group of image frames of the sequence of image frames to generate a target frame (such as by shifting and adding frames as depicted in FIG. 3 and FIG. 5), and generating a difference frame based on subtracting the reference frame from the target frame (such as by subtracting a shifted clutter estimate frame from an average target estimate frame, as depicted in FIG. 3 and FIG. 5).

The one or more storage devices 840 include nonvolatile storage devices, such as magnetic disks, optical disks, or flash memory devices. In a particular example, the storage devices 840 include both removable and non-removable memory devices. The storage devices 840 are configured to store an operating system, images of operating systems, applications (e.g., one or more of the applications 834), and program data (e.g., the program data 836). In a particular aspect, the system memory 830, the storage devices 840, or both, include tangible computer-readable media. In a particular aspect, one or more of the storage devices 840 are external to the computing device 810.

The one or more input/output interfaces 850 that enable the computing device 810 to communicate with one or more input/output devices 870 to facilitate user interaction. For example, in some implementations the one or more input/output interfaces 850 include a display interface, an input interface, or both. For example, the input/output interface 850 is adapted to receive input from a user, to receive input from another computing device, or a combination thereof. In some implementations, the input/output interface 850 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, N.J.). In some implementations, the input/output device 870 includes one or more user interface devices and displays, including some combination of buttons, keyboards, pointing devices, displays, speakers, microphones, touch screens, and other devices.

The processor(s) 820 are configured to communicate with devices or controllers 880 via the one or more communications interfaces 860. In an example, the one or more communications interfaces 860 includes a network interface. In some implementations, the devices or controllers 880 include, for example, the image sensor 104, one or more other devices, or any combination thereof.

In conjunction with the described systems and methods, an apparatus for image processing is disclosed that includes means for combining a first group of image frames of a sequence of image frames to generate a reference frame. In some implementations, the means for combining the first group of image frames corresponds to the reference frame accumulator 130, the processor(s) 112, the device 102, the computing device 810, the processor(s) 820, one or more other circuits or devices configured to combine the first group of image frames, or a combination thereof.

The apparatus also includes means for combining a second group of image frames of the sequence of image frames to generate a target frame. In some implementations, the means for combining the second group of image frames corresponds to the target frame accumulator 140, the processor(s) 112, the device 102, the computing device 810, the processor(s) 820, one or more other devices configured to combine a second group of image frames of the sequence of image frames to generate a target frame, or a combination thereof.

The apparatus also includes means for generating a difference frame based on subtracting the reference frame from the target frame. In an example, the means for generating a difference frame corresponds to the difference frame generator 150, the processor(s) 112, the device 102, the computing device 810, the processor(s) 820, one or more other devices configured to generate a difference frame based on subtracting the reference frame from the target frame, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-8. In some implementations, part or all of one or more of the operations or methods of FIGS. 1-8 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for image processing, the device comprising:
   a memory configured to store multiple image frames of a sequence of image frames;
   a reference frame accumulator configured to combine a first group of three or more image frames of the sequence of image frames to generate a reference frame;
   a target frame accumulator configured to combine a second group of three or more image frames of the sequence of image frames to generate a target frame, the image frames of the second group taken after the image frames of the first group; and
   a difference frame generator configured to generate a difference frame based on subtracting the reference frame from the target frame.

2. The device of claim 1, further comprising a noise estimator configured to determine fixed pattern noise data associated with an image sensor and to perform pixel-by-pixel correction of each frame of the sequence of image frames.

3. The device of claim 1, further comprising a target delay unit configured to determine a delay, in the sequence of image frames, between a sequentially last frame of the first group and a sequentially first frame of the second group.

4. The device of claim 3, wherein the delay is determined such that a separation is provided between positions of a moving object in a scene captured in the first group and positions of the moving object in the scene captured in the second group.

5. The device of claim 1, wherein the reference frame accumulator is further configured to:
   perform a shift to pixels of one or more image frames of the first group or to pixels of a reference accumulation frame that represents an accumulation of image frames of the first group; and
   perform an averaging or normalization operation to pixel values of the image frames of the first group, the reference accumulation frame, or a combination thereof.

6. The device of claim 1, wherein the target frame accumulator is further configured to:
   perform a shift to pixels of one or more image frames of the second group or to pixels of a target accumulation frame that represents a partial accumulation of the image frames of the second group; and
   perform an averaging or normalization operation to pixel values of the image frames of the second group, the target accumulation frame, or a combination thereof.

7. The device of claim 1, wherein the sequence of image frames is received from an image sensor and corresponds to a scene, and further comprising a frame rate engine configured to determine a frame rate of the image sensor based on a relative motion of the image sensor relative to the scene.

8. The device of claim 7, wherein the frame rate engine is configured to control the image sensor that generates the image frames to take the image frames at the frame rate.

9. The device of claim 8, further comprising the image sensor.

10. The device of claim 9, wherein the image sensor is mounted in a satellite, aircraft, or watercraft.

11. A device for image processing, the device comprising:
    a memory configured to store multiple frames of a sequence of image frames from an image sensor while the image sensor is in motion relative to a scene;
    a frame rate engine configured to determine a frame rate of the image sensor, based on a rate of relative motion of the image sensor relative to the scene, so that sequential image frames in the sequence of image frames are offset relative to the scene by an offset amount that substantially matches an integer number of pixels and the frame rate engine configured to send the frame rate to the image sensor to enable the image sensor to provide the image frames at the frame rate;
    a reference frame accumulator configured to combine a first group of three or more image frames of the sequence of image frames to generate a reference frame;
    a target frame accumulator configured to combine a second group of three or more image frames of the sequence of image frames to generate a target frame, the image frames of the second group taken after the image frames of the first group; and
    a difference frame generator configured to generate a difference frame based on subtracting the reference frame from the target frame.

12. The device of claim 11, wherein the frame rate engine is further configured to provide sensor alignment information to the image sensor to align the image sensor along a direction of relative motion of the image sensor relative to the scene.

13. The device of claim 11, wherein the image sensor is mounted in a satellite, aircraft, or watercraft.

14. A method for image processing, the method comprising:
- combining a first group of three or more image frames of a sequence of image frames to generate a reference frame;
- combining a second group of three or more image frames of the sequence of image frames to generate a target frame, the image frames of the second group taken after the image frames of the first group; and
- generating a difference frame based on subtracting the reference frame from the target frame.

15. The method of claim 14, further comprising:
- determining fixed pattern noise data associated with an image sensor; and
- performing pixel-by-pixel correction of each frame of the sequence of image frames.

16. The method of claim 14, further comprising determining a delay, in the sequence of image frames, between a sequentially last frame of the first group and a sequentially first frame of the second group to provide a separation between positions of a moving object in a scene captured in the first group of image frames and positions of the moving object in the scene captured in the second group of image frames.

17. The method of claim 14, further comprising:
- performing a shift to pixels of one or more frames of the first group or to pixels of a reference accumulation frame that represents a partial accumulation of the three or more frames of the first group; and
- performing an averaging or normalization operation to pixel values of the three or more frames of the first group, the reference accumulation frame, or a combination thereof.

18. The method of claim 14, further comprising:
- performing a shift to pixels of one or more frames of the second group of image frames or to pixels of a target accumulation frame that represents a partial accumulation of the three or more frames of the second group of image frames; and
- performing an averaging or normalization operation to pixel values of the three or more frames of the second group, the target accumulation frame, or a combination thereof.

19. The method of claim 14, wherein the sequence of image frames is received from an image sensor and corresponds to a scene, and further comprising setting a frame rate of the image sensor based on a relative motion of the image sensor relative to the scene.

20. The method of claim 19, wherein the frame rate is determined so that sequential images are offset relative to the scene by an offset amount that substantially matches an integer number of pixels.

\* \* \* \* \*